(12) United States Patent
Sheth

(10) Patent No.: US 9,645,800 B2
(45) Date of Patent: May 9, 2017

(54) SYSTEM AND METHOD FOR FACILITATING STATIC ANALYSIS OF SOFTWARE APPLICATIONS

(71) Applicant: Veracode, Inc., Burlington, MA (US)

(72) Inventor: Mansi Sheth, Merrimack, NH (US)

(73) Assignee: Veracode, Inc., Burlington, MA (US)

(*) Notice: Subject to any disclaimer, the term of this patent is extended or adjusted under 35 U.S.C. 154(b) by 0 days.

(21) Appl. No.: 14/577,388

(22) Filed: Dec. 19, 2014

(65) Prior Publication Data
US 2016/0179486 A1    Jun. 23, 2016

(51) Int. Cl.
*G06F 9/44* (2006.01)
*G06F 9/45* (2006.01)
*G06F 21/57* (2013.01)
*G06F 11/36* (2006.01)

(52) U.S. Cl.
CPC .............. *G06F 8/427* (2013.01); *G06F 8/75* (2013.01); *G06F 11/3604* (2013.01); *G06F 21/577* (2013.01); *G06F 2221/033* (2013.01)

(58) Field of Classification Search
None
See application file for complete search history.

(56) References Cited

U.S. PATENT DOCUMENTS

| 6,742,175 B1 * | 5/2004 | Brassard | G06F 8/71 717/107 |
| 2005/0273860 A1 | 12/2005 | Chess et al. | |

FOREIGN PATENT DOCUMENTS

| WO | WO-2009065168 A1 | 5/2009 |
| WO | WO-2014114131 A1 | 7/2014 |

OTHER PUBLICATIONS

Tessier, J., "The Dependency Finder User Manual", for Dependency Finder version 1.2.1-beta4, Retrieved on May 22, 2015 from website: http://depfind.sourceforge.net/Manual.html, 47 pages.
International Search Report and Written Opinion for International Patent Applicatoin No. PCT/US2015/066777 dated Mar. 2, 2016 (13 pages).
"Introduction to OMG's Unified Modeling Language® (UML®)," What is UML | Unified Modeling Language, (2005), 5 pages.
"Generate Code from UML Class Diagrams," Generate Code from UML Class Diagrams, (2015), 8 pages.

* cited by examiner

*Primary Examiner* — Qamrun Nahar
(74) *Attorney, Agent, or Firm* — Goodwin Procter LLP

(57) ABSTRACT

In system for enabling static vulnerability analysis of a software/web application that includes an indirectly modeled language portion and a directly modeled language portion, an indirectly modeled language information extractor select nodes of certain types from a syntax tree corresponding to the indirectly modeled language source code. Generally, the types of nodes that are selected are relevant to taint propagation. For one or more of the selected nodes, one or more statements corresponding to one or more of a type of the node, an input to the node, and an object associated with the node are generated. A static analyzer configured for a directly modeled language may perform vulnerability analysis of the software/web application using the generated statements.

18 Claims, 2 Drawing Sheets

SYSTEM AND METHOD FOR FACILITATING STATIC ANALYSIS OF SOFTWARE APPLICATIONS

FIELD OF THE INVENTION

This disclosure generally relates to detection of vulnerabilities in software applications, and more particularly to systems and methods for detecting vulnerabilities in a software application specified using two or more programming languages.

BACKGROUND OF THE INVENTION

Software applications typically include flaws or defects, causing the software to operate in an unintended or undesired manner. Some defects can also be exploited to gain unauthorized access to the software and/or data associated therewith. Static vulnerability analysis techniques that can analyze the source code and/or one or more compiled binary files corresponding to a software application can be used to detect such vulnerabilities. A static analyzer that can analyze one or more compiled binary files corresponding to a software application is useful at least in situations where the source code is unavailable for a number of reasons, e.g., when the owner of the source code wishes not to disclose the source code to the tester performing the static analysis, when a portion of the binary files is obtained from a third party and the corresponding source code is not available from the third party, etc. As used herein, binary files are not limited to machine code only and may include files that are derived by processing source code and that include representations that are not source code representations, such as byte code, object code, etc.

In many instances, a static analyzer supports one or more programming languages (e.g., Java, C, C++, Python, etc.), i.e., the analyzer is customized for or configured specifically for one or more selected programming languages. The definition of a programming language can include a particular version thereof as well. For example, Java version 6 can be considered to be a different programming language than Java version 8. A static analyzer thus configured can be used to analyze a software system/application represented in binary and/or source code formats only if the source code is specified in one or more of the supported languages and if any binary portion of the software application is derived from one or more supported programming languages. In the discussion below, a language supported by a particular static analyzer is called a directly modeled language. A language that is not supported by a particular static analyzer is generally called an indirectly modeled programming language. Specifically, a static analyzer, by definition, does not directly analyze source code specified in an indirectly modeled language and also does not directly analyze binary code derived from source code specified in an indirectly modeled language.

In some situations, a software application includes not only a directly modeled language portion but also an indirectly modeled language portion. The directly modeled language portion may include one or more compiled binaries and/or source code files. The indirectly modeled language portion typically includes source code, e.g., scripts, specified in one or more languages other than any of the directly modeled languages corresponding to the static analyzer to be used to analyze the software system/application. Additionally or in the alternative, the indirectly modeled language portion may include an intermediate representation derived from an indirectly modeled language specification, as long as a syntax tree can be generated from the intermediate representation. Examples of indirectly modeled languages include Velocity Template Language (VTL), Freemarker, etc. A script written in an indirectly modeled language can directly access one or more data objects in the directly modeled language portion and can thus permit reading and/or modifying information associated with the data objects specified in the directly modeled language portion. This allows an indirectly modeled language script to adapt dynamically the behavior of the software application as desired, e.g., in response to the characteristics of the environment in which the application is executed, identity of the user for the benefit of whom the application is executed, etc.

The facility to access directly one or more data objects specified in the directly modeled language portion, however, can also expose certain vulnerabilities in the software application and may even introduce new vulnerabilities. For example, the indirectly modeled language script can be used to access data without authorization and a user input received by the indirectly modeled language script can be used to modify or delete important application data either unintentionally or with malice. As described above a static analyzer customized for a selected group of programming languages (i.e., directly modeled languages) typically cannot analyze source and/or binary code specified and/or derived from an indirectly modeled language, i.e., a language that is not included in the selected group. It is not uncommon, however, for a software system/application and/or a web application to be specified using both directly and indirectly modeled languages. Therefore, generally available static analyzers may not adequately detect the vulnerabilities that may be introduced by and/or exist within an indirectly modeled language portion of the software. Even when two different static analyzers are used—a first one configured for a group of directly modeled languages and a second one configured for languages that are indirectly modeled from the perspective of the first static analyzer—certain vulnerabilities may nevertheless not be detected because the two analyzers generally do not exchange their respective analysis and inferences so as to perform a comprehensive analysis of the overall software/web application. Therefore, there is a need for an improved system and/or method for detecting defects and/or vulnerabilities in software and/or web applications.

SUMMARY OF THE INVENTION

Various embodiments of the present invention can facilitate detection of vulnerabilities in software and/or web applications/systems that include a directly modeled language portion and an indirectly modeled language portion, without needing a static analyzer configured for the indirectly modeled language. This is achieved, at least in part, by programmatically analyzing one or more indirectly modeled language files (e.g., VTL source files) associated with the software application/system and by selecting those objects and/or programming constructs that are associated with access to data objects specified or accessed in the directly modeled language portion. Certain other objects and/or programming constructs that are determined not to be associated with any data objects specified in the indirectly modeled language may not be analyzed further and, as such, full compilation and/or vulnerability analysis of the indirectly modeled language scripts can be avoided. For one or more of the selected objects and/or programming constructs, one or more respective directly modeled language statements may be generated that can indicate access to the data objects specified/used in the directly modeled language portion and/or indicate any relationship between a user input and such data objects. A static analyzer configured for one or more directly modeled languages can analyze these statements and can detect any vulnerabilities that may be introduced and/or exposed by the indirectly modeled language portion.

Accordingly, in one aspect, a method is provided for enabling static analysis, e.g., vulnerability analysis, of a software/web application/system that includes indirectly modeled code, by an analyzer configured for a directly modeled language and that does not directly analyze any code that is specified in an indirectly modeled language or is derived from such a specification. The method includes transforming by an indirectly modeled language information extractor, that may be executed by a processor, hardware circuitry, or a combination thereof, a syntax tree of a code segment in an indirectly modeled language by including in each node of the syntax tree a respective location identifier. The method also includes identifying by the indirectly modeled language information extractor (a processor, in general) a set of nodes of selected types in the transformed syntax tree. One or more types that are associated with taint propagation may be selected. For each node in the identified set, the method includes generating by the processor a statement in a directly modeled language. The statement may be based on, at least in part, one or more of: (i) a type of the node, (ii) a type of an input to the node, and (iii) an object corresponding to the node. The input to the node may be a user input or a variable or an object derived from the user input. A derived object and/or the object corresponding to the node may be specified in the indirectly modeled language code or in the directly modeled language code. In some embodiments, modifying the syntax tree includes reordering nodes of the syntax tree according to parent-child relationship among the nodes.

The indirectly modeled language code may include one or more of Velocity Template Language (VTL) code, Freemarker code, etc. Languages that may be developed in the future but that are not supported by a selected static analyzer, and that may be used to describe the indirectly modeled language portion of a software application/system (e.g., a web application) can be analyzed using various embodiments described herein and codes specified using such languages and/or representations derived from such future indirectly modeled languages are within the scope of the various embodiments. The directly modeled language code, which can be source and/or binary code, may include one or more of Java code, Python code, C code, C++ code, etc. Code specified in any future developed language for which a static analyzer may be developed is considered directly modeled language code that can be part of the directly modeled language portion, and is also within the scope of various embodiments. In some embodiments, the transformed syntax tree includes a JavaScript Object Notification (JSON) tree. The location identifier may include a line number and a column number.

In some embodiments, the type of the node includes a REFERENCE type. Correspondingly, the generated statement may include a SINK statement. Additionally or in the alternative, in some embodiments, the type of the node includes a SET directive type, a LOOP directive type, and/or an IF directive type. Correspondingly, the generated statement may include a PROPAGATOR statement. The type of an input associated with a node can be a variable, a method associated with a variable, a property of a variable, or a combination of any of these input types. A method associated with a variable may be a default method or a non-default method.

In some embodiments, the method includes performing by an analyzer configured for a directly modeled language, taint propagation analysis of a code module specified in the directly modeled language by incorporating in the code module the generated statement(s). The directly modeled language module may specify an object corresponding to a node in the identified set, and the generated statement corresponding to the node may include the object corresponding to that node.

In another aspect, a computer system includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to transform a syntax tree of a code segment in an indirectly modeled language by including in each node of the syntax tree a respective location identifier. The syntax tree may be received in the memory module and the modified syntax tree may be stored in the memory module. The instructions further program the processing unit to identify a set of nodes of selected types in the transformed syntax tree. Each selected type may be associated with taint propagation. The instructions also program the processing unit, for each node in the identified set, to generate a statement in a directly modeled language. The statement may be, based on, at least in part, one or more of: (i) a type of the node, (ii) a type of an input to the node, and (iii) an object corresponding to the node. In various embodiments, the instructions can program the processing unit to perform one or more of the method steps described above.

In another aspect, an article of manufacture that includes a non-transitory storage medium has stored therein instructions which, when executed by a processor program the processor, which is in electronic communication with a memory, to transform a syntax tree of a code segment in an indirectly modeled language by including in each node of the syntax tree a respective location identifier. The syntax tree may be received in the memory and the modified syntax tree may be stored in the memory. The instructions further program the processor to identify a set of nodes of selected types in the transformed syntax tree. Each selected type may be associated with taint propagation. The instructions also program the processor, for each node in the identified set, to generate a statement in a directly modeled language. The statement may be, based on, at least in part, one or more of: (i) a type of the node, (ii) a type of an input to the node, and (iii) an object corresponding to the node. In various embodiments, the stored instructions can program the processor to perform one or more of the method steps described above.

Various embodiments described herein can facilitate comprehensive vulnerability analyses of a software application that includes directly modeled language functionalities and scripts written in an indirectly modeled language, without needing any substantial modification to the analyzer configured for the directly modeled language and without needing a full indirectly modeled-language compiler and/or analyzer. As such, vulnerabilities in various kinds of software systems/applications that are assembled by combining different directly modeled language functionalities and scripts written in different indirectly modeled languages can be analyzed.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Figure 1:
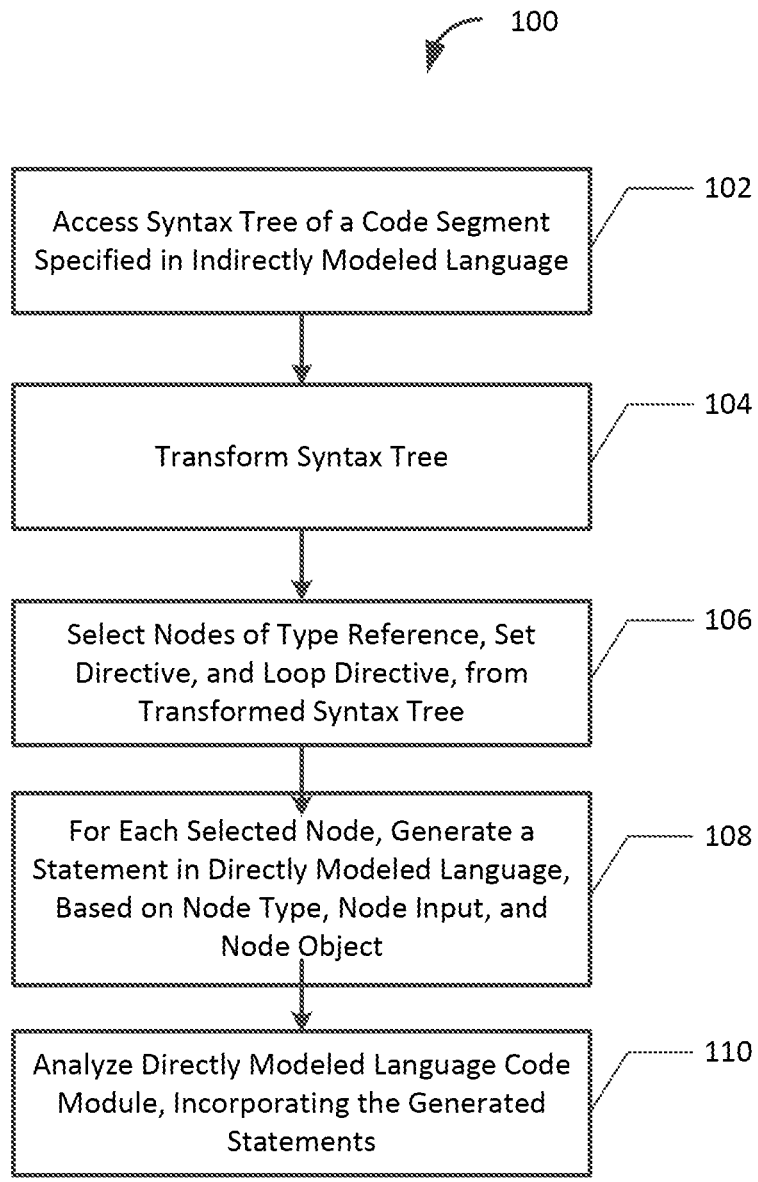
FIG. 1 illustrates one example of a process of analyzing indirectly modeled-language source code so as to facilitate vulnerability analysis by a static analyzer configured for a directly modeled language, according to one embodiment.

With reference to FIG. 1, in a process 100, a code segment written or specified in an indirectly modeled language is selected in step 102. The code segment is part of a software/web application/system to be analyzed, e.g., to detect any vulnerabilities therein. As described above, indirectly modeled language generally means a language for which a static analyzer is not readily accessible to a tester/user of the software application. Examples of indirectly modeled languages include but are not limited to Velocity Template Language (VTL) and Freemarker. In step 102, a syntax tree representing the indirectly modeled-language source code is received in memory. A syntax tree generator may be used to generate the syntax tree.

In step 104, an indirectly modeled language information extractor, which is not a comprehensive static analyzer, traverses the syntax tree which, in general, includes nodes representing operators (e.g. addition, assignment, loop, condition, etc.) and the corresponding operands (e.g., variables, objects, strings, numbers, etc.), that are described in the indirectly modeled language code. A processor implementing the indirectly modeled language information extractor may be used for syntax tree traversal or a different processor may implement the syntax tree generator used to generate the syntax tree. During traversal, the indirectly modeled language information extractor modifies the syntax tree in step 104, for example, by annotating one or more nodes with locations in the source code of the operators and/or operands corresponding to the respective syntax tree nodes. The location of an operator/operand generally includes a line number and a column number in the indirectly modeled language code.

The modification in the step 104 can also include reordering the nodes in the syntax tree according to parent-child relationships thereof. These parent-child relationships between nodes are implied in the syntax tree. In one particular reordering, all of the children nodes of a particular parent node are grouped together. The grouping can be hierarchical, i.e., the children nodes of a child are grouped together with the child node. If a particular node is determined to be relevant to vulnerability analysis during further analysis, as described below, the reordering described herein can facilitate efficient identification of all of the parents and children of that node and further analysis of those nodes, while avoiding analysis of other unrelated nodes that may not be relevant to the vulnerability analysis.

Vulnerability analysis often includes taint analysis. In general, an operand is considered to be tainted if the operand includes a user input and/or if the operand is derived, at least in part, from a user input. An operator, and the corresponding operation performed by the operator, are generally considered to be tainted if the operator uses a tainted operand. An unexpected, erroneous, or malicious user input can cause a modification of an operand in an unplanned and/or undesired manner and/or may cause the software system to perform an unplanned and/or undesired operation. The possibility that a software application can behave in such an undesirable, unplanned manner is often considered to be an example of a vulnerability in the software application, while it should be understood that other types of vulnerabilities may also exist in the software application. Taint analysis, i.e., determining vulnerabilities associated with user input, is typically at least a part of the overall vulnerability analysis performed by a static analyzer. Cross-site scripting (XSS) vulnerabilities is an important class of vulnerabilities associated with user input.

If a user input initially affects an operation and/or an operand in the software application's indirectly modeled language portion, which is not analyzed by the static analyzer configured for a directly modeled language, the subsequent taint analysis performed by the static analyzer may be incomplete, and one or more vulnerabilities may not be detected. In order to avoid or at least minimize this problem, various embodiments of the methods and systems described herein identify operators and/or operands that are specified in the indirectly modeled language portion and that may be affected by a user input and that may further affect one or more operations and/or one or more operands specified in the directly modeled language portion. One or more operations and/or one or more operators that are specified in the directly modeled language portion and that may be directly affected by a user input received by the indirectly modeled language code may also be identified. The various embodiments also provide this information to the static analyzer so that it may perform taint analysis, thus facilitating detection of vulnerabilities described above, including XSS vulnerabilities.

To this end, as an example, in the process 100 the indirectly modeled language information extractor determines in step 106 whether a particular node is relevant to vulnerability analysis (e.g., taint analysis) based on, at least, the type of the node. In general, nodes that output or display a value associated with an object specified in the directly modeled language may be considered relevant to vulnerability analysis. In the context of VTL and/or other indirectly modeled languages, these nodes are commonly called nodes of type REFERENCE. Nodes that assign values to directly modeled language specified and/or indirectly modeled language specified objects, e.g., from a user input, may also be relevant to vulnerability analysis. Alternatively or in addition, nodes that assign values from the objects specified in the indirectly modeled language and/or directly modeled language portions to other objects specified in the indirectly modeled and/or directly modeled language portions may be relevant to vulnerability analysis, as well. In the context of VTL and/or other indirectly modeled languages, these nodes are commonly called nodes of type SET directive. In some embodiments, nodes that can cause iterations of operations that may use a user input and/or an object specified in the indirectly modeled language and/or directly modeled language portions as an operand, often called nodes of type LOOP or LOOP directive, are considered to be relevant to vulnerability analysis. In some embodiments, nodes that can cause a change in the flow of operations, e.g., based on a user input, often called nodes of type "IF," are considered to be relevant to vulnerability analysis. In various embodiments, the nodes of one or more of these types are selected in the step 106 for further analysis.

For a selected node, a directly modeled language statement is generated in step 108 based on one or more of the type of the node, a type of an input, i.e., an operand associated with the node, and an object corresponding to the node. The node input can be an operand to an operator, such as an assignment, a condition of an IF statement, etc., associated with the node. The node input may be a user input or an operand derived therefrom. The object corresponding to the node may also be an operand to the operator associated with the node. The object may be specified in the indirectly modeled language portion or the directly modeled language portion of the software application. The statement is generated in the step 108 such that the information contained therein can be analyzed by the static analyzer configured for a directly modeled language to determine if any operation and/or object specified in the directly modeled language portion may be tainted from a user input received from the indirectly modeled language portion.

For example, for a node of type REFERENCE the indirectly modeled language information extractor may generate a SINK statement that can indicate to the static analyzer that a value corresponding to an object specified in the directly modeled language portion is displayed and/or output by the software application. For the nodes of type SET directive and/or LOOP directive, the indirectly modeled language information extractor may generate a PROPAGATOR statement. A propagator statement can indicate to the static analyzer that an operation and/or an operand specified in the directly modeled language portion may be affected through one or more operations and/or operands in the indirectly modeled language portion by a user input received in the indirectly modeled language portion. For example, for a node of type SET, in one embodiment, a propagator statement specifies that an object specified in the directly modeled language portion was assigned a user input value or a value of a variable derived from a user input. In other embodiments, a propagator statement specifies that an object specified in the directly modeled language portion was assigned a value obtained from a property of another object, typically specified as a variable, which may be defined in the indirectly modeled language portion or in the directly modeled language portion.

In some embodiments, a propagator statement specifies that an object specified in the directly modeled language portion was assigned a value obtained by invoking a method associated with another object, which may be defined in the indirectly modeled language portion or in the directly modeled language portion. The method may be a default method or a non-default method. In general, a default method is defined by a runtime environment in which the directly modeled language code portion can execute. For example, in the Java 2 Platform Enterprise Edition (J2EE) environment includes request and response default methods, among others. A non-default method, on the other hand, may be specified in the directly modeled language portion by a developer thereof. Some default methods permit modification of an object specified in the indirectly and/or directly modeled language portions of the software based on user input received through the default method. Therefore, analysis of the invocation of a default method can be important from the taint analysis perspective. By identifying that a particular method is a default method, the propagator statement can direct a downstream analyzer to analyze the identified default method and any associated objects to determine taint propagation.

In various embodiments, the indirectly modeled language information extractor may visit one or more nodes that are associated with a node or type LOOP and/or IF, and that are of type SET or REFERENCE, and generates a sink or propagator statement as described above for each of the visited nodes. The generated statement may include an object that is associated with the visited node and that may be specified or defined in the indirectly modeled language portion or the directly modeled language portion. In some embodiments, the indirectly modeled language information extractor selects all nodes first in the step 106 and then generates one or more statements for one or more of the selected nodes, in the step 108. In other embodiments, the indirectly modeled language information extractor performs the steps 106, 108 alternately, selecting one or more nodes in the step 106, then generating in the step 108 at least one statement for at least one of the selected nodes, and then repeating this sequence.

These directly modeled language (e.g., Java, C, C++, Python) statements can be analyzed by the static analyzer, so as to perform taint analysis and thus, to expose any vulnerabilities (e.g., XSS vulnerabilities) in the software application. Because in the step 108 the indirectly modeled language information extractor provides directly modeled language statements to the static analyzer, the static analyzer that is not configured to analyze indirectly modeled language code can readily perform vulnerability analysis of a software application that includes both an indirectly modeled language portion and a directly modeled language portion. Moreover, because the indirectly modeled language information extractor executing the process 100, or a similar process, generates one or more statements for analysis by the static analyzer using information derived from a syntax tree, as described above, the vulnerability analysis of the software application can be performed without needing a comprehensive static analyzer configured for the indirectly modeled language. In some embodiments, such vulnerability analysis, using the statements generated by the indirectly modeled language information extractor, is performed using a static analyzer in an optional step 110.

Figure 2:
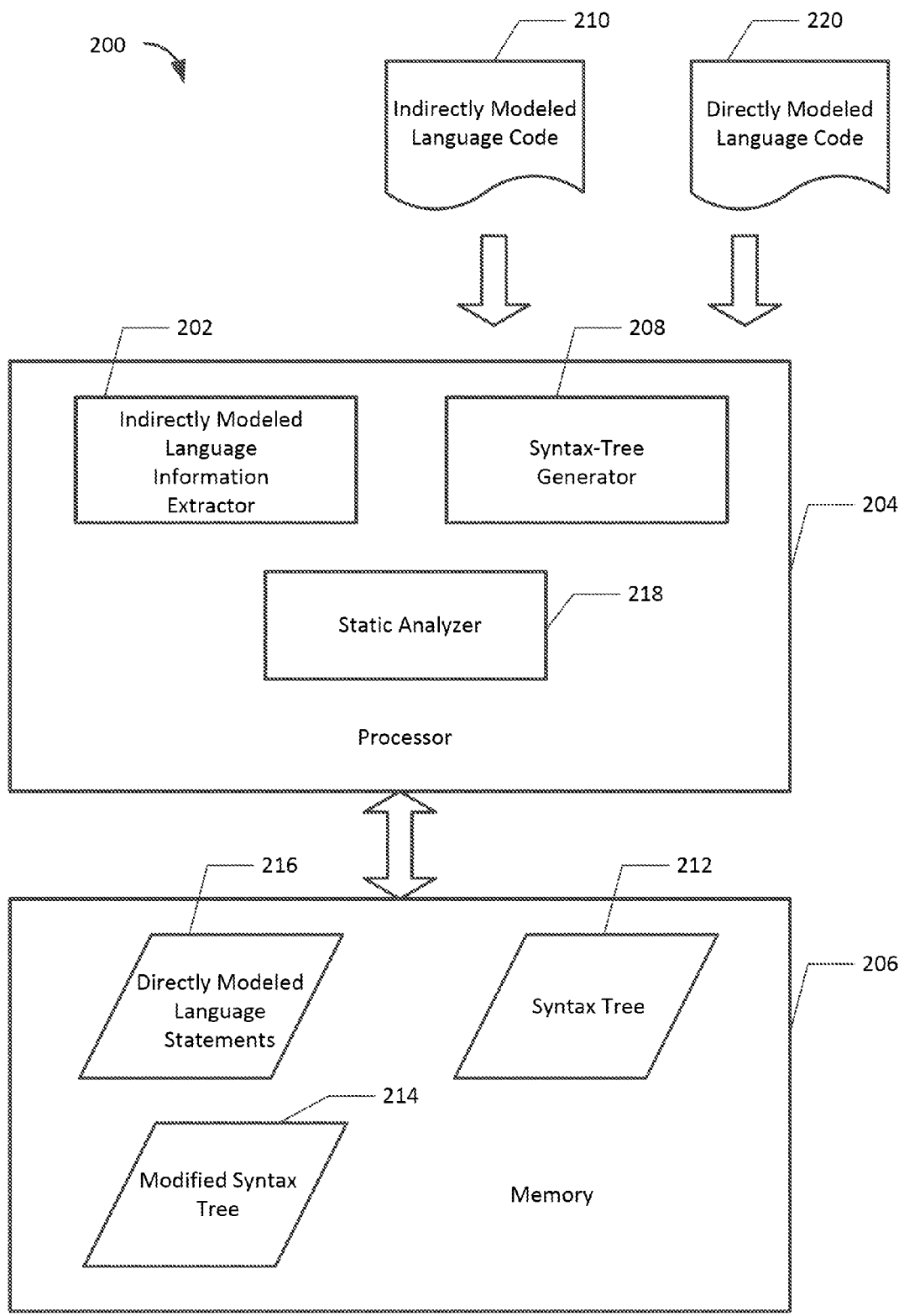
FIG. 2 schematically depicts a system and a typical environment thereof, for analyzing and extracting information from indirectly modeled-language source code, according to one embodiment.

With reference to FIG. 2, a system 200 includes an indirectly modeled language information extractor 202 that is implemented by a processor 204 in electrical communication with a memory module 206. The system 200 also includes a syntax tree generator 208 that is also implemented by the processor 204. In some embodiments, however, the syntax tree generator is implemented by a different processor. The syntax tree generator 208 receives one or more indirectly modeled language code files 210 and generates a syntax tree 212, which is modified, as described above, by the indirectly modeled language information extractor 202 to generate a modified syntax tree 214. In some embodiments, the modified syntax tree 214 is specified as a JavaScript Object Notification (JSON) tree. The indirectly modeled language information extractor 202 selects one or more nodes from the modified syntax tree 214, and generates one or more directly modeled language statements 216, as described above. A static analyzer 218, implemented by the processor 204 or by another processor, analyzes the statement(s) 216 and one or more directly modeled language binary and/or source code files 220, so as to perform vulnerability analysis of a software application that is based on both the directly modeled language binary and/or source code file(s) 220 and the indirectly modeled language code file(s) 210.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/ processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, I claim:

1. A method of enabling static analysis of indirectly modeled code by an analyzer lacking capability for direct analysis of any indirectly modeled code, the method comprising:
    transforming by a processor a syntax tree of a source code segment written in an indirectly modeled language that is not supported by a static analyzer, by including in each node of the syntax tree a respective location identifier identifying a location of at least one of an operator and an operand corresponding to that node in source code specified in the indirectly modeled language;

identifying by the processor a set of nodes of selected types in the transformed syntax tree, each selected type being associated with taint propagation indicating propagation of an operand comprising or derived from a user input to an operator specified in a code module specified in a directly modeled language, the static analyzer supporting the directly modelled language; and for each node in the identified set, generating by the processor a statement in the directly modeled language, based on, at least in part, at least one of: (i) a type of the node, (ii) a type of an input to the node, and (iii) an object corresponding to the node.

2. The method of claim 1, wherein transforming the syntax tree comprises reordering nodes of the syntax tree according to parent-child relationship among the nodes.

3. The method of claim 1, wherein:
the indirectly modeled language code comprises at least one of Velocity Template Language (VTL) code and Freemarker code; and
the directly modeled language code comprises at least one of Java code, Python code, C code, and C++ code.

4. The method of claim 1, wherein the transformed syntax tree comprises a JavaScript Object Notification (JSON) tree.

5. The method of claim 1, wherein the location identifier comprises a line number and a column number.

6. The method of claim 1, wherein:
the type of the node comprises a reference type; and
the generated statement comprises a sink statement.

7. The method of claim 1, wherein:
the type of the node comprises at least one of a set directive type and a loop directive type; and
the generated statement comprises a propagator statement.

8. The method of claim 1, wherein the type of an input to the node comprises at least one of: a variable, a method associated with a variable, and a property of a variable.

9. The method claim 8, wherein the method associated with a variable is a default method.

10. The method of claim 1, further comprising performing by an analyzer corresponding to a directly modeled language, taint propagation analysis of a code module specified in the directly modeled language by incorporating in the code module the generated statement.

11. The method of claim 10, wherein the directly modeled language module specifies an object corresponding to at least one node in the identified set, and the generated statement corresponding to the at least one node comprises the object corresponding to that node.

12. A system for enabling static analysis of indirectly modeled code by an analyzer lacking capability for direct analysis of any indirectly modeled code, the system comprising:
a first processor; and
a first memory in electrical communication with the first processor, the first memory comprising instructions which, when executed by a processing unit comprising at least one of the first processor and a second processor, the processing unit being in electrical communication with a memory module comprises at least one of the first memory and a second memory, program the processing unit to:
transform a syntax tree of a source code segment written in an indirectly modeled language that is not supported by a static analyzer, by including in each node of the syntax tree a respective location identifier identifying a location of at least one of an operator and an operand corresponding to that node in source code specified in the indirectly modeled language;

identify a set of nodes of selected types in the transformed syntax tree, each selected type being associated with taint propagation indicating propagation of an operand comprising or derived from a user input to an operator specified in a code module specified in a directly modeled language, the static analyzer supporting the directly modelled language; and for each node in the identified set, generate a statement in the directly modeled language, based on, at least in part, at least one of: (i) a type of the node, (ii) a type of an input to the node, and (iii) an object corresponding to the node.

13. The system of claim 12, wherein:
the indirectly modeled language code comprises at least one of Velocity Template Language (VTL) code and Freemarker code; and
the directly modeled language code comprises at least one of Java code, Python code, C code, and C++ code.

14. The system of claim 12, wherein:
the type of the node comprises a reference type; and
the instructions program the processing unit to generate a statement comprising a sink statement.

15. The system of claim 12, wherein:
the type of the node comprises at least one of a set directive type and a loop directive type; and
the instructions program the processing unit to generate a propagator statement.

16. The system of claim 12, further comprising a code analyzer lacking capability for direct analysis of any indirectly modeled code and that is programmed to perform taint propagation analysis of a code module specified in the directly modeled language by incorporating in the code module the generated statement.

17. The system of claim 16, wherein the instructions program the processing unit to perform taint propagation analysis of a code module specified in the directly modeled language by incorporating in the code module the generated statement.

18. An article of manufacture comprising a non-transitory storage medium having stored therein instructions which, when executed by a processor program the processor to:
transform a syntax tree of a source code segment written in an indirectly modeled language that is not supported by a static analyzer, by including in each node of the syntax tree a respective location identifier identifying a location of at least one of an operator and an operand corresponding to that node in source code specified in the indirectly modeled language;
identify a set of nodes of selected types in the transformed syntax tree, each selected type being associated with taint propagation indicating propagation of an operand comprising or derived from a user input to an operator specified in a code module specified in a directly modeled language, the static analyzer supporting the directly modelled language; and
for each node in the identified set, generate a statement in the directly modeled language, based on, at least in part, at least one of: (i) a type of the node, (ii) a type of an input to the node, and (iii) an object corresponding to the node.

* * * * *